US008744381B2

(12) United States Patent
Wang

(10) Patent No.: US 8,744,381 B2
(45) Date of Patent: Jun. 3, 2014

(54) ADJUSTMENT MODULE, ELECTRONIC DEVICE WITH THE ADJUSTMENT MODULE, AND ANTENNA PERFORMANCE ADJUSTING METHOD THEREOF

(75) Inventor: Yin-Tsai Wang, Taipei (TW)

(73) Assignee: Wistron Corporation, New Taipei (TW)

( * ) Notice: Subject to any disclaimer, the term of this patent is extended or adjusted under 35 U.S.C. 154(b) by 66 days.

(21) Appl. No.: 13/541,493

(22) Filed: Jul. 3, 2012

(65) Prior Publication Data

US 2013/0088390 A1 Apr. 11, 2013

(30) Foreign Application Priority Data

Oct. 7, 2011 (TW) ............................ 100136527 A

(51) Int. Cl.
*H04B 1/04* (2006.01)
*H04Q 1/50* (2006.01)

(52) U.S. Cl.
USPC .......................................... 455/121; 343/861

(58) Field of Classification Search
USPC .............. 455/80, 82, 121, 281, 120; 343/820, 343/822, 850, 852, 860, 861
See application file for complete search history.

(56) References Cited

U.S. PATENT DOCUMENTS

| | | | | |
|---|---|---|---|---|
| 7,242,917 | B2 * | 7/2007 | Abbasi et al. | 455/277.1 |
| 7,933,562 | B2 * | 4/2011 | Rofougaran et al. | 455/80 |
| 8,185,062 | B2 * | 5/2012 | Rofougaran et al. | 455/80 |
| 2013/0017860 | A1 * | 1/2013 | Chen | 455/556.1 |

* cited by examiner

*Primary Examiner* — Sonny Trinh
(74) *Attorney, Agent, or Firm* — Muncy, Geissler, Olds & Lowe, P.C.

(57) ABSTRACT

An adjustment module, an electronic device with the adjustment module, and an antenna performance adjusting method thereof are disclosed. The adjustment module is used for adjusting an antenna module. The antenna module is disposed in the electronic device and used for radiating a wireless signal. The adjustment module includes a monitoring module, a determining module, and a capacitance adjusting unit. The monitoring module is used for detecting an alternating current signal waveform when the antenna module radiates the wireless signal. The determining module receives the alternating current signal waveform and is used for generating an adjusting voltage value when the alternating current signal waveform is a non-constant amplitude. The capacitance adjusting unit is used for changing a capacitance value according to the adjusting voltage value to adjust a resonance point coordinate of the antenna module.

14 Claims, 7 Drawing Sheets

ADJUSTMENT MODULE, ELECTRONIC DEVICE WITH THE ADJUSTMENT MODULE, AND ANTENNA PERFORMANCE ADJUSTING METHOD THEREOF

BACKGROUND OF THE INVENTION

1. Field of the Invention

The present invention relates to an adjustment module, an electronic device with the adjustment module, and an antenna performance adjusting method; more particularly, the present invention relates to an adjustment module, an electronic device with the adjustment module, and an antenna performance adjusting method that adjust the antenna performance via adjusting the capacitance value.

2. Description of the Related Art

As technology develops, the wireless communication system of transmission for the electronic devices is increasingly popular. Therefore, many kinds of antenna modules of different designs are disclosed, such as a ring antenna module, a monopole antenna module, a microstrip antenna module, a plate inverted-F antenna module, a plate antenna module, and a printed antenna module. The antenna modules have different shapes and outward appearance designs according to different frequencies and applications.

However, in the prior art, when a human body or a metal object is closed to the antenna module, the resonance point of the antenna module may be shifted. According to the fundamental of the antenna module, the antenna module has the best performance when its frequency is on the resonance point. Therefore, if the frequency of the antenna module is shifted from the resonance point, the performance of the antenna module decreases.

Please refer to FIG. 1A and FIG. 1B, which are the schematic drawing of a resonance point of an antenna module. FIG. 1A illustrates a schematic drawing of a resonance point of an antenna module of the prior art in the best performance. FIG. 1B illustrates a schematic drawing of a shifting resonance point of an antenna module of the prior art.

According to the fundamental of the antenna module, the resonance point is the best frequency point that allowing the antenna module to achieve the optimum radiation efficiency. As shown in FIG. 1A, when designing the antenna module, the frequency of the resonance point P1 must be adjusted to coordinate the frequency of the wireless signal radiated from the antenna module. When a human body or a metal object is not closed to the antenna module, the frequency of the wireless signal radiated from the antenna module is about 1.95 GHz, and the return loss is about −13 dB; at the moment, the resonance point P1 is not shifted.

However, as shown in FIG. 1B, when the human body or the metal object is closed to the antenna module and the frequency is about 1.95 GHz, the return loss of the antenna module will be about −13 dB, and the resonance point P2 will be shifted obviously. Therefore, the radiation efficiency decreases, and the impedance or the voltage standing wave ratio of the antenna module cannot achieve the best performance. The power of the wireless signal cannot be radiated completely, such that the communication of the antenna module may be poor.

Therefore, there is a need to provide an adjustment module for adjusting the antenna module, an electronic device with an adjustment module, and an antenna performance adjusting method, to solve the problem of the prior art.

SUMMARY OF THE INVENTION

It is an object of the present invention to provide an adjustment module for adjusting the antenna performance via adjusting the capacitance value.

It is another object of the present invention to provide an electronic device with the abovementioned adjustment module.

It is another object of the present invention to provide an antenna performance adjusting method.

To achieve the abovementioned object, the adjustment module of the present invention is used for adjusting the antenna module. The antenna module is located in the electronic device to radiate the wireless signal. The adjustment module comprises a monitoring module, a determining module, and a capacitance adjusting unit. The monitoring module is electrically connected to the antenna module, and used for detecting an alternating current signal waveform when the antenna module radiates the wireless signal. The determining module is electrically connected to the monitoring module for receiving the alternating current signal waveform, and generating an adjusting voltage value when the alternating current signal waveform is a non-constant amplitude. The capacitance adjusting unit is electrically connected to the determining module and the antenna module for changing a capacitance value according to the adjusting voltage value to adjust a resonance point coordinate of the antenna module.

The electronic device with the adjustment module of the present invention comprises an antenna module, a wireless signal processing module and the adjustment module. The antenna module is used for radiating the wireless signal. The wireless signal processing module is electrically connected to the antenna module for setting the setting power of the wireless signal. The adjustment module which comprises a monitoring module, a determining module, and a capacitance adjusting unit, is used for adjusting the antenna module. The monitoring module is electrically connected to the antenna module, and used for detecting an alternating current signal waveform when the antenna module radiates the wireless signal. The determining module is electrically connected to the monitoring module for receiving the alternating current signal waveform, and generating an adjusting voltage value when the alternating current signal waveform is a non-constant amplitude. The capacitance adjusting unit is electrically connected to the determining module and the antenna module, for changing a capacitance value according to the adjusting voltage value to adjust a resonance point coordinate of the antenna module.

The antenna performance adjusting method of the present invention comprises the steps of: detecting an alternating current signal waveform when the antenna module radiates a wireless signal; determining if the alternating current signal waveform is a constant amplitude; generating an adjusting voltage value when the alternating current signal waveform is a non-constant amplitude; and changing a capacitance value of a capacitance adjusting unit according to the adjusting voltage value, for adjusting a resonance point coordinate of the antenna module.

DETAILED DESCRIPTION OF THE PREFERRED EMBODIMENT

These and other objects and advantages of the present invention will become apparent from the following description of the accompanying drawings, which disclose several embodiments of the present invention. It is to be understood that the drawings are to be used for purposes of illustration only, and not as a definition of the invention.

Figure 2:
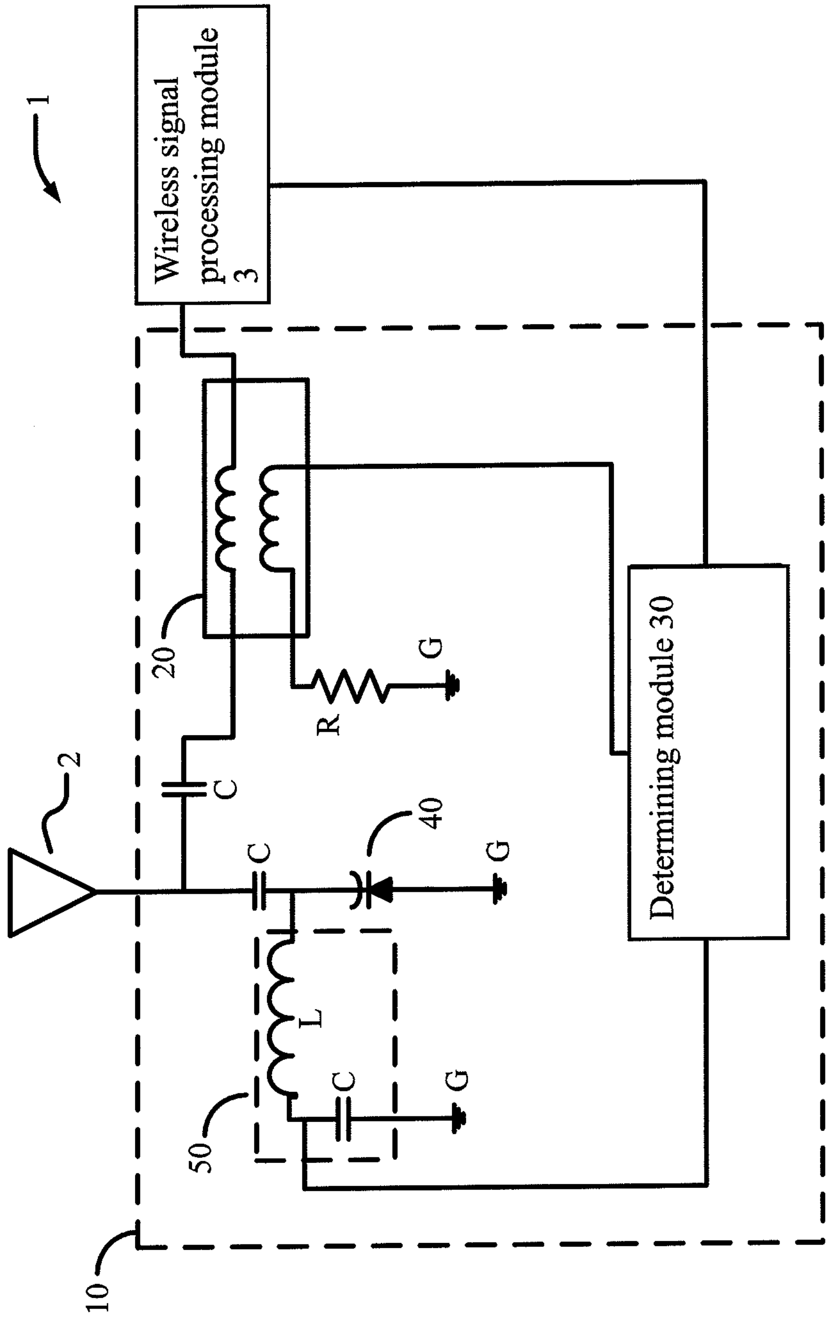
FIG. 2 illustrates a structure drawing of an electronic device and an adjustment module of the present invention.

Please refer to FIG. 2, which illustrates a structure drawing of an electronic device and an adjustment module of the present invention.

In one embodiment of the present invention, the electronic device 1 can be a notebook computer, a tablet computer, a smartphone, or other devices which can transfer the wireless signal, but the present invention is not limited to the abovementioned devices. The electronic device 1 comprises an antenna module 2, a wireless signal processing module 3, and an adjustment module 10. The antenna module 2 is used for radiating a wireless signal, but the style or specification of the antenna module 2 of the present invention is not limited.

The wireless signal processing module 3 is electrically connected to the antenna module 2. The wireless signal processing module 3 is formed by software, firmware or hardware, but the present invention is not limited to that design. The wireless signal processing module 3 is used for receiving the wireless signal via the antenna module 2, or delivering the wireless signal to the antenna module 2; the wireless signal delivered to the antenna module 2 is set by the wireless signal processing module 3. A power amplifier, a match circuit (not shown in FIG), or the passive element (such as capacitance element C and resistor element R) can be located between the wireless signal processing module 3 and the antenna module 2, for processing the signal. The abovementioned circuit elements are already disclosed in common antenna design, and it is not the focal point of the present invention, so there is no need to describe here.

The adjustment module 10 is electrically connected to the antenna module 2 and the wireless signal processing module 3, for adjusting the antenna module 2 according to the status of the antenna module 2. The adjustment module 10 comprises a monitoring module 20, a determining module 30, a capacitance adjusting unit 40, and a protection module 50. The monitoring module 20 can be a coupler electrically connected to the electrical connecting of the antenna module 2 and the wireless signal processing module 3, for delivering the wireless signal, and outputting a part of the wireless signal via a coupled port to obtain the alternating current signal waveform.

Figure 3A:
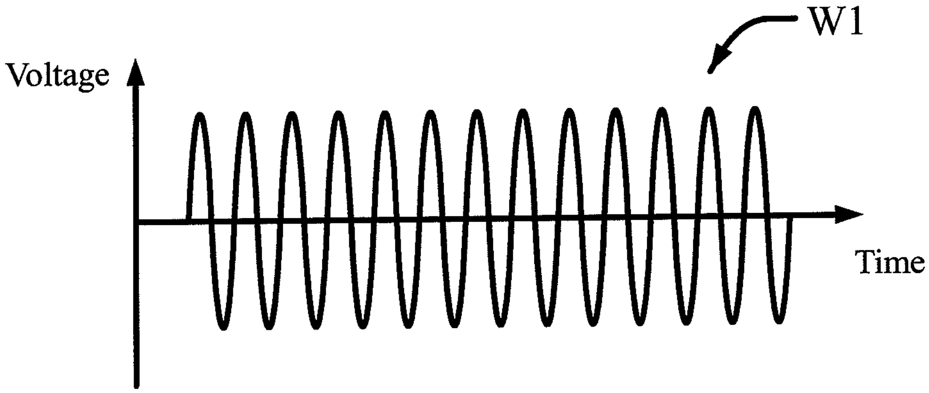
FIG. 3A illustrates a waveform drawing of an alternating current signal of a constant amplitude of the present invention.

According to the antenna theory, when the antenna module 2 completely matches the wireless signal processing module 3, there will be no reflecting signals. Therefore, at this moment, the alternating current signal waveform receiving by the monitoring module 20 is shown in FIG. 3A; FIG. 3A illustrates an alternating current signal waveform drawing of a constant amplitude of the present invention. From the constant amplitude W1 shown in FIG. 3A, it can be seen that the resonance point of the antenna module 2 is not shifted, such that the resonance point coordinate of the antenna module 2 is like what shown in FIG. 1A.

Figure 1A:
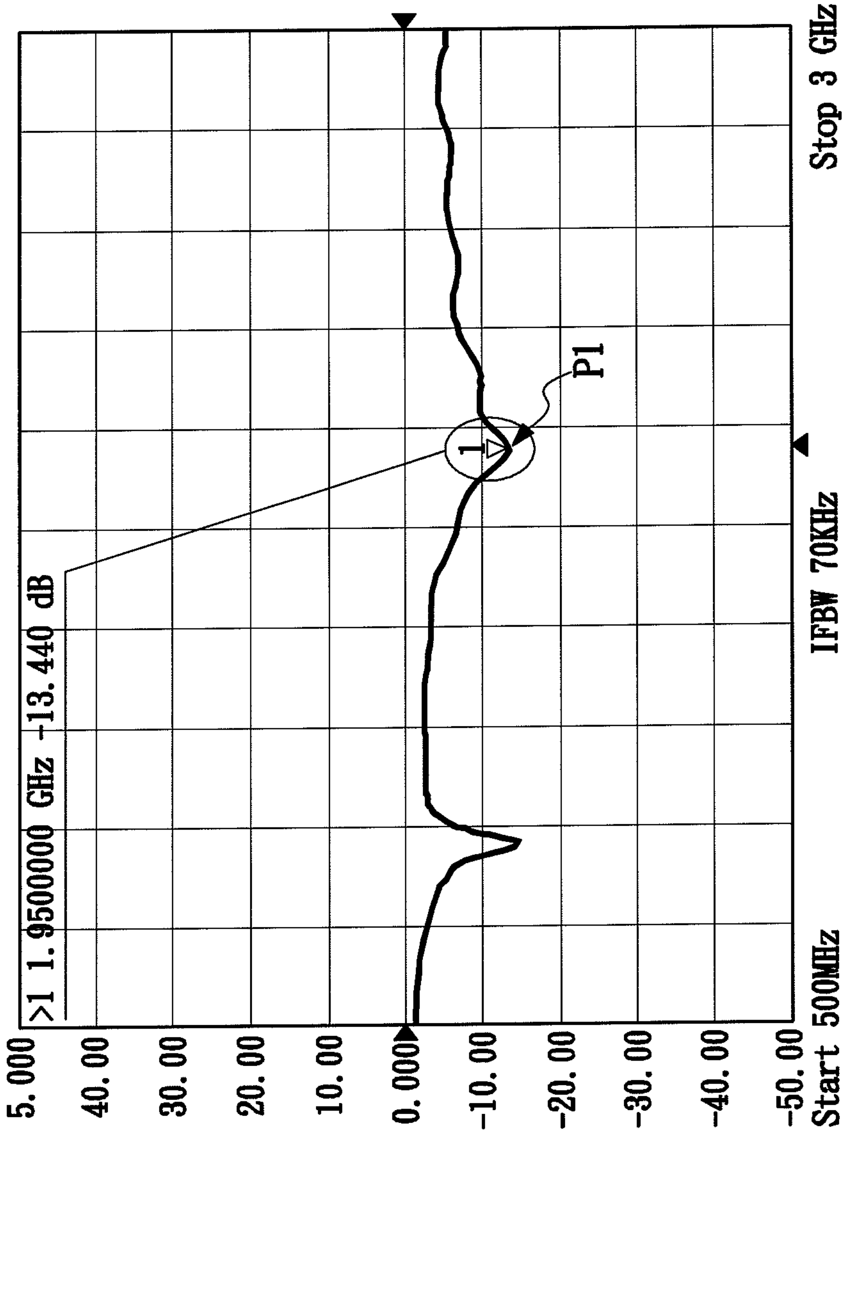
FIG. 1A (Prior Art)
FIG. 1A illustrates a schematic drawing of a resonance point of an antenna module of the prior art in the best performance.
Figure 1B:
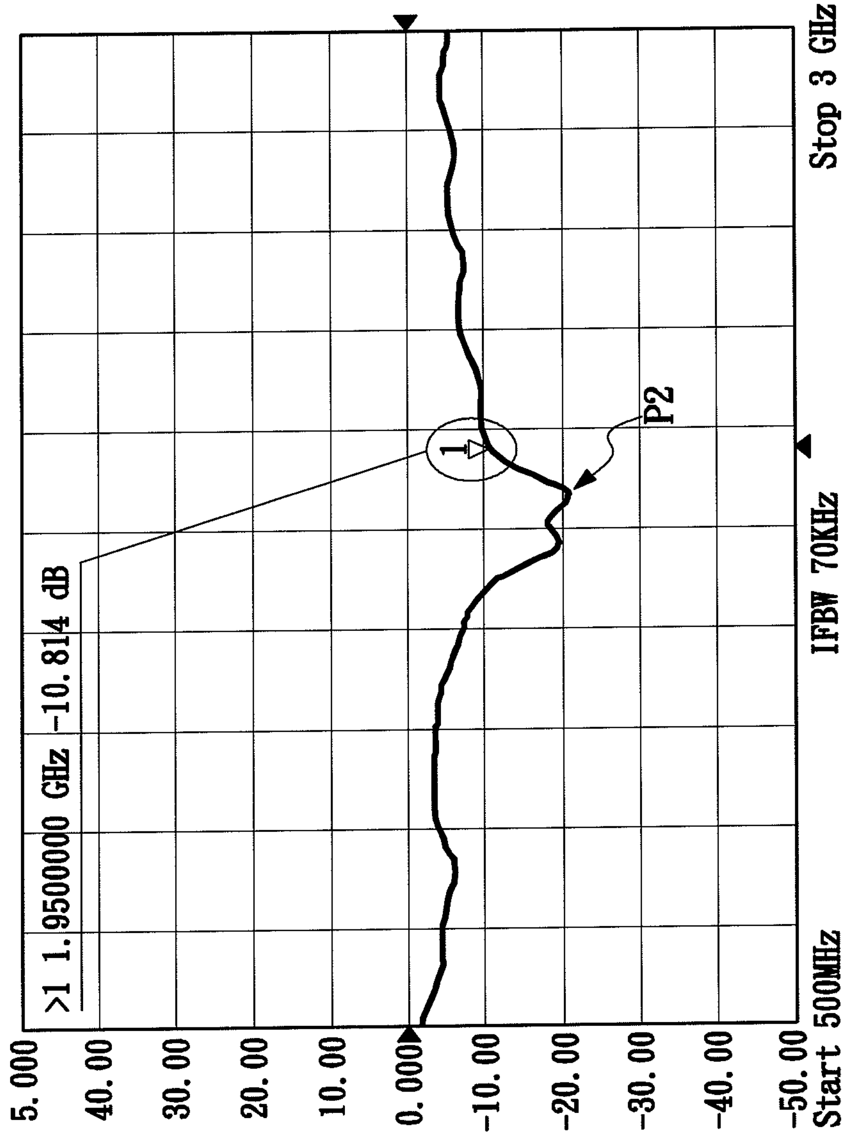
FIG. 1B (Prior Art)
FIG. 1B illustrates a schematic drawing of a shifting resonance point of an antenna module of the prior art.
Figure 3B:
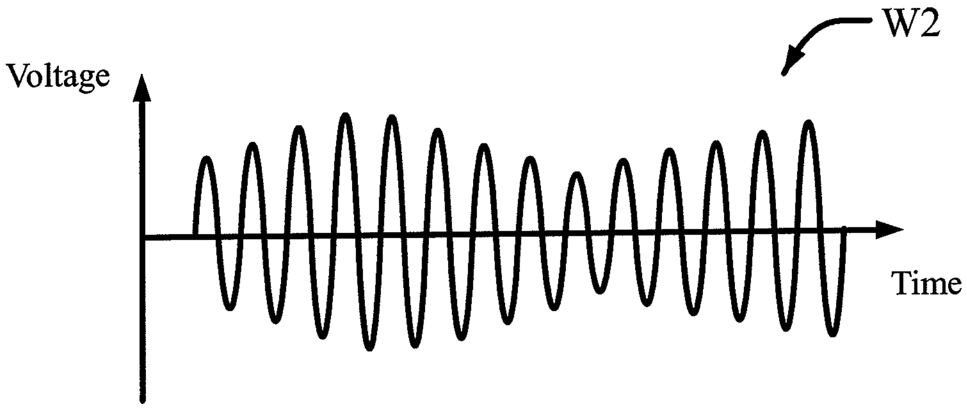
FIG. 3B illustrates a waveform drawing of an alternating current signal of a non-constant amplitude of the present invention.

But when a human body or a metal object is closed to the antenna module 2, the antenna module 2 incompletely matches the power amplifier of the wireless signal processing module 3, such that the resonance point coordinate of the antenna module 2 is shifted (as shown in FIG. 1B). At this moment, the alternating current signal waveform receiving by the monitoring module 20 is shown in FIG. 3B; FIG. 3B illustrates an alternating current signal waveform drawing of a non-constant amplitude of the present invention. The monitoring module 20 obtains a non-constant amplitude W2.

The determining module 30 is electrically connected to the monitoring module 20. The determining module 30 can be formed by software, firmware, or hardware, such as a digital signal processor, but the present invention is not limited to that design. The determining module 30 is used for receiving the alternating current signal waveform, and obtaining the voltage signal value according to the alternating current signal waveform; which means when the alternating current signal waveform is a non-constant amplitude W2, the determining module 30 generates an adjusting voltage value according to the adjustment. The adjusting voltage value adjusts the capacitance value of the capacitance adjusting unit 40. Furthermore, when the alternating current signal waveform is a constant amplitude W1, the determining module 30 generates a regular voltage value to keep the capacitance value of the capacitance adjusting unit 40.

The capacitance adjusting unit 40 is a varactor diode, but the present invention is not limited to that design. The capacitance adjusting unit 40 is electrically connected to the antenna module 2; therefore, the capacitance value of the capacitance adjusting unit 40 can be regarded as the capacitance value of the antenna module 2. The capacitance adjusting unit 40 is electrically connected to the determining module 30 for changing the capacitance value according to the adjusting voltage value. The capacitance value of the capacitance adjusting unit 40 is inversely proportional to the receiving voltage value. Therefore, in one embodiment of the present invention, when the resonance point of the antenna module 2 is shifted, the determining module 30 reduces the capacitance value of the capacitance adjusting unit 40 via increasing the adjusting voltage value, such that the resonance point of the antenna module 2 can be adjusted. When the resonance point of the antenna module 2 is not shifted, the determining module 30 generates the regular voltage value to keep the capacitance value of the capacitance adjusting unit 40.

A protection module 50 can be electrically connected between the determining module 30 and the antenna module 2, for preventing the adjusting voltage value interfered by the wireless signal radiated from the antenna module 2. The protection module 50 comprises an inductance element L or a capacitance element C. By the features of the inductance element L, the most of the wireless signal of high frequency is blocked, and the rest of the wireless signal is delivered to the earth terminal G via the capacitance element C. Therefore, the adjusting voltage value will not be interfered by the wireless signal of high frequency.

Figure 4:
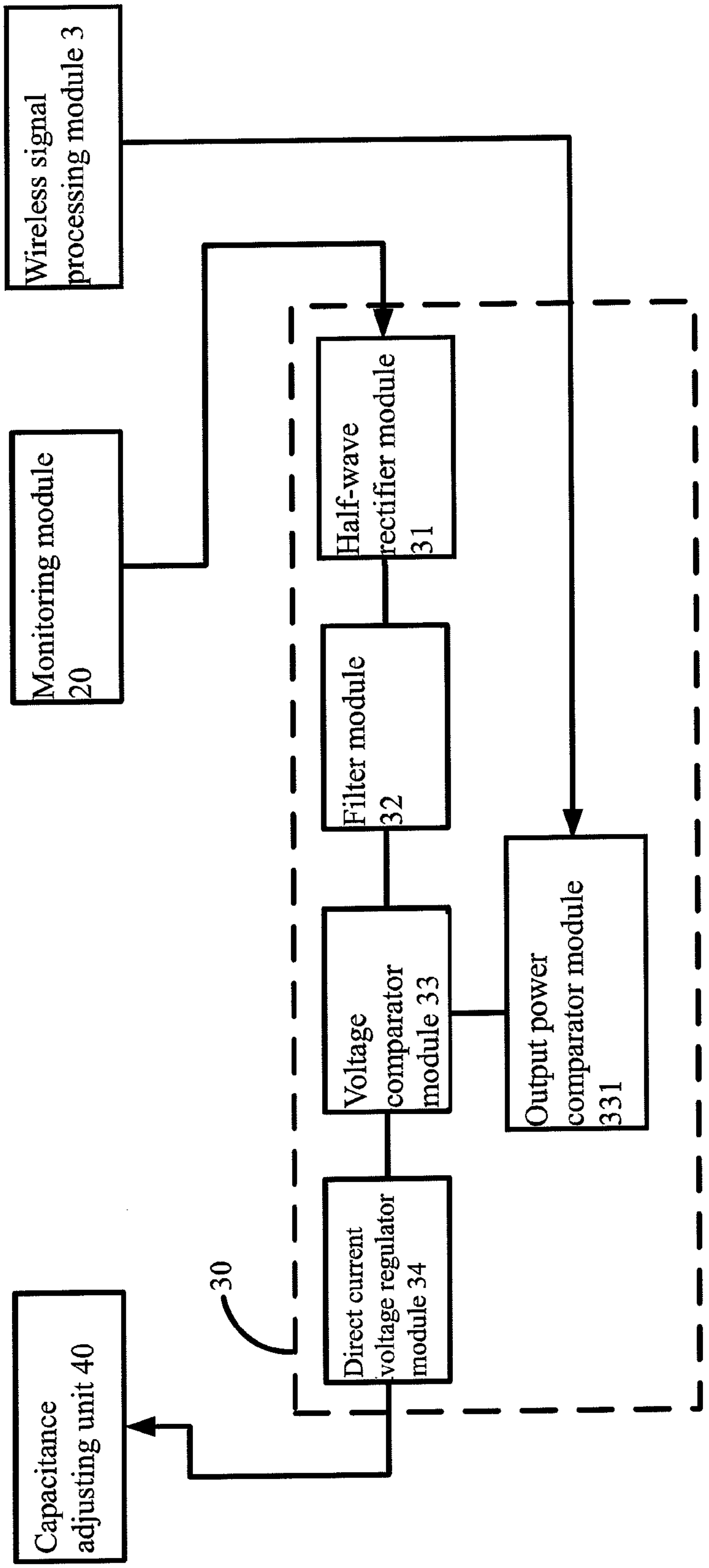
FIG. 4 illustrates a structure drawing of a determining module of an adjustment module of the present invention.

Please refer to FIG. 4, which illustrates a structure drawing of a determining module of an adjustment module of the present invention.

In one embodiment of the present invention, the determining module 30 comprises a half-wave rectifier module 31, a filter module 32, a voltage comparator module 33, an output power comparator module 331, and a direct current voltage regulator module 34. The half-wave rectifier module 31 is electrically connected to the monitoring module 20, for receiving the alternating current signal waveform and transferring it to the half-wave signal waveform. The filter module 32 is electrically connected to the half-wave rectifier module 31 for filtering the half-wave signal waveform to a filtering signal, such that the filtering signal can represent the monitoring voltage value. Therefore, the voltage value of the wireless signal radiated by the antenna module 2 can be known. The filtering signals method is already disclosed in the prior art, so there is no need to describe here.

The voltage comparator module 33 is electrically connected to the filter module 32 for comparing the standard voltage value and the monitoring voltage value processed by the filter module 32; wherein the standard voltage value is obtained by the output power comparator module 331 according to the setting power of the wireless signal. The output power comparator module 331 is electrically connected to the voltage comparator module 33 and the wireless signal processing module 3. When the wireless signal processing module 3 delivers the wireless signal to the antenna module 2, the power of the wireless signal is set by the wireless signal processing module 3. Therefore, the output power comparator module 331 knows the power of the wireless signal from the wireless signal processing module 3, and every power has a corresponding voltage value. For example, when the power is 2 watt, the standard voltage value of the wireless signal is 0.5 volt; when the power is 3 watt, the standard voltage value of the wireless signal is 0.6 volt; when the power is 4 watt, the standard voltage value of the wireless signal is 0.7 volt. Therefore, the output power comparator module 331 can use a list of queries, to check the corresponding standard voltage value according to the setting power of the wireless signal processing module 3.

Then the voltage comparator module 33 compares the monitoring voltage value and the standard voltage value to control the direct current voltage regulator module 34. The direct current voltage regulator module 34 is electrically connected to the voltage comparator module 33 and the capacitance adjusting unit 40. The measurement of the monitoring voltage value and the standard voltage value are the same, which represent that the resonance point coordinate of the antenna module 2 is not shifted (as shown in FIG. 1A). Therefore, the voltage comparator module 33 controls the direct current voltage regulator module 34 to output the regular voltage value to the capacitance adjusting unit 40, and to change the capacitance value to adjust the resonance point of the antenna module 2. The monitoring voltage value received by the filter module 32 and the standard voltage value are different, which represent that the resonance point coordinate of the antenna module 2 is shifted (as shown in FIG. 1B). According to the difference between the monitoring voltage value and the standard voltage value, the direct current voltage regulator module 34 generates the adjusting voltage value, and delivers to the capacitance adjusting unit 40.

Figure 5:
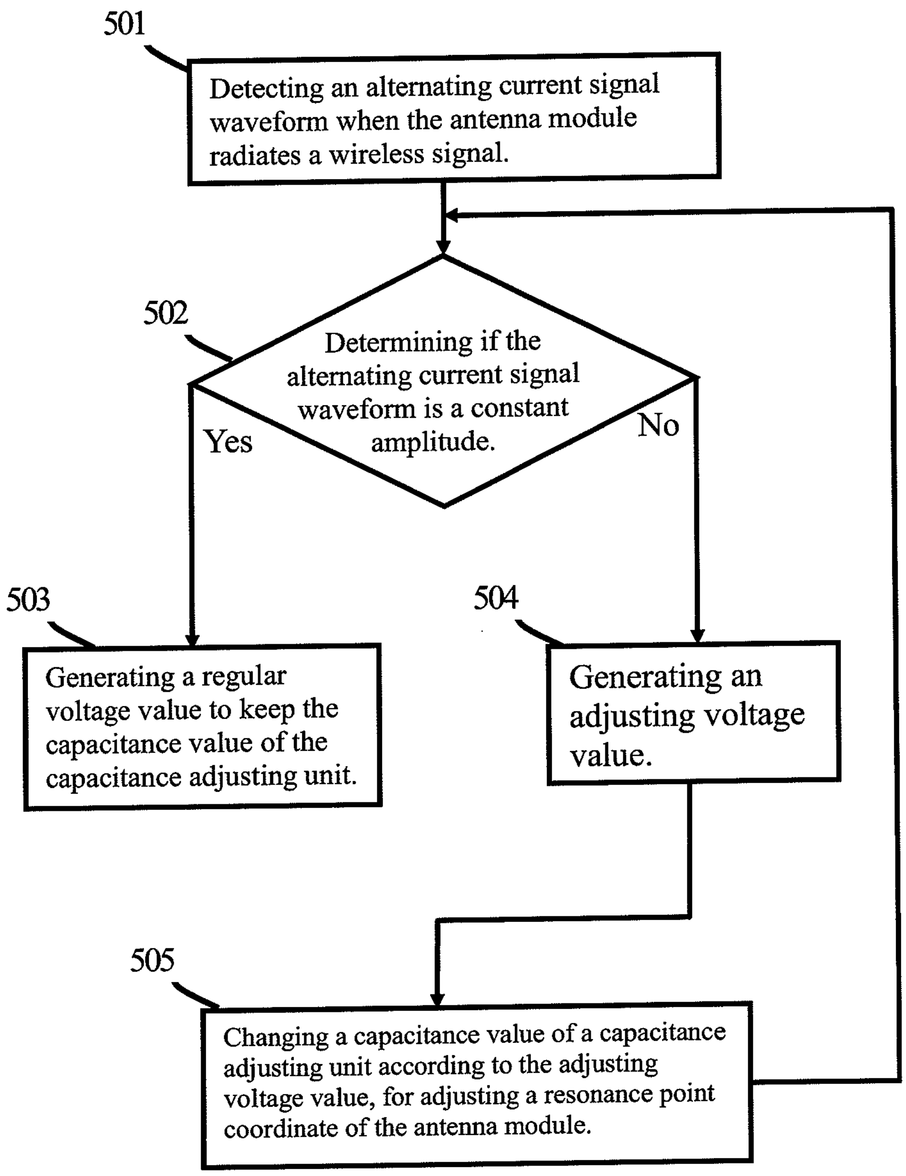
FIG. 5 illustrates a flowchart of an antenna performance adjusting method of the present invention.

Please refer to FIG. 5, which illustrates a flowchart of an antenna performance adjusting method of the present invention. It is to be understood that, the electronic device 1 with the adjustment module 10 is taken as an example to describe the following antenna performance adjusting method of the present invention, but the antenna performance adjusting method of the present invention is not limited to apply the adjustment module 10.

First, the method goes to Step 501: detecting an alternating current signal waveform when the antenna module radiates a wireless signal.

First, the wireless signal processing module 3 delivers the wireless signal radiated by the antenna module 2; the monitoring module 20 detects the alternating current signal waveform of the wireless signal when the antenna module 2 radiates the wireless signal.

Then the method goes to Step 502: determining if the alternating current signal waveform is a constant amplitude.

Then the determining module 30 determines the type of the alternating current signal waveform, to determine it is a constant amplitude W1 (as shown in FIG. 3A) or a non-constant amplitude W2 (as shown in FIG. 3B). The determining method can uses the monitoring voltage value obtained via the alternating current signal waveform to determine, but the present invention is not limited to that design. The detail steps of using the monitoring voltage value to determine will be described later, so there is no need to describe here.

If the alternating current signal waveform is a constant amplitude W1, the method goes to Step 503: generating a regular voltage value to keep the capacitance value of the capacitance adjusting unit.

When the alternating current signal waveform is a constant amplitude W1 as shown in FIG. 3A, it represents that the circuit elements between the antenna module 2 and the wireless signal processing module 3 completely match, such that the resonance point coordinate of the antenna module 2 is not shifted (as shown in FIG. 1A). The determining module 30 generates a regular voltage value to the capacitance adjusting unit 40 to keep the capacitance value of the capacitance adjusting unit 40.

When the alternating current signal waveform is a non-constant amplitude W2, the method goes to Step 504: generating an adjusting voltage value.

When the alternating current signal waveform is a non-constant amplitude W2 as shown in FIG. 3B, it represents that there is a human body or a metal object is closed to the antenna module 2, such that the resonance point coordinate of the antenna module 2 is shifted (as shown in FIG. 1B). The determining module 30 generates the adjusting voltage value and delivers the adjusting voltage value to the capacitance adjusting unit 40 when the alternating current signal waveform is a non-constant amplitude W2.

Then the method goes to Step 505: changing a capacitance value of a capacitance adjusting unit according to the adjusting voltage value, for adjusting a resonance point coordinate of the antenna module.

The capacitance adjusting unit 40 changes the capacitance value according to the adjusting voltage value, to adjust the whole capacitance value of the antenna module 2, and to further adjust the resonance point coordinate of the antenna module 2 to the original position.

Finally, the determining module 30 returns to Step 502 to determine if the alternating current signal waveform is still a non-constant amplitude W2. By the abovementioned repeating method of adjusting, the resonance point coordinate of the antenna module 2 is adjusted to the position which is not shifted (as shown in FIG. 1A).

Figure 6:
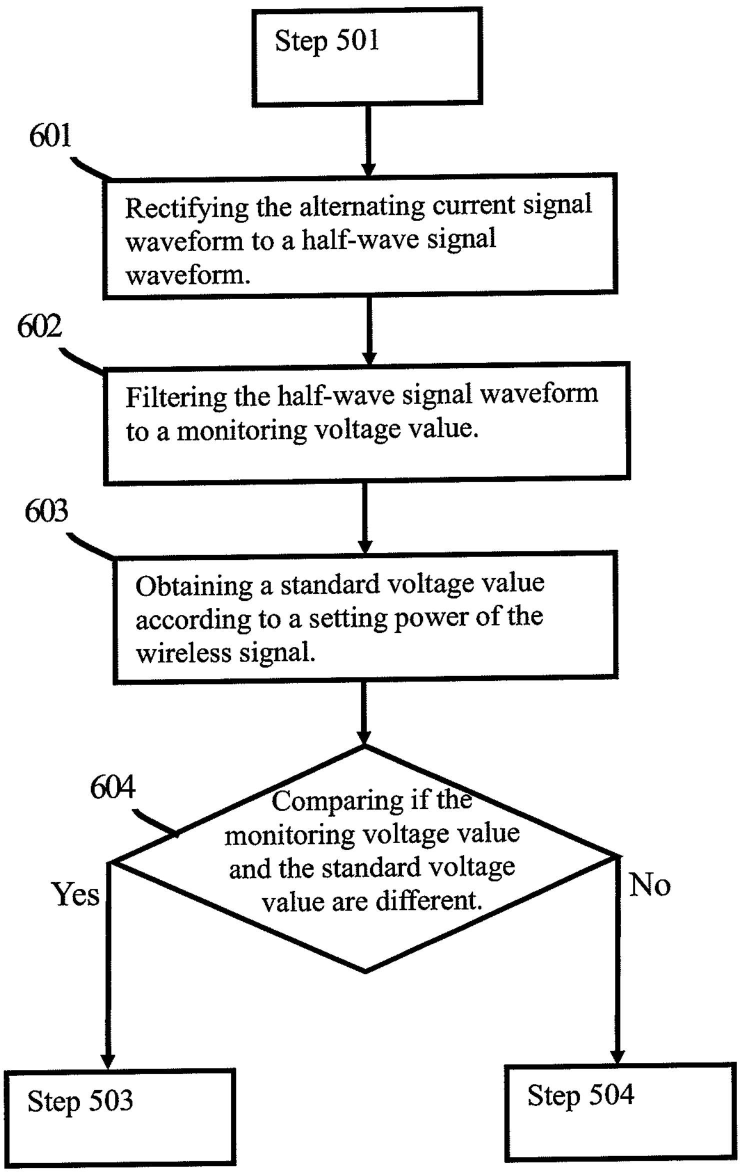
FIG. 6 illustrates a flowchart of the steps of generating an adjusting voltage value of the present invention.

Please refer to FIG. 6 for one embodiment of determining if the alternating current signal waveform is a constant amplitude W1 or a non-constant amplitude W2 is Step 502. FIG. 6 illustrates a flowchart of the steps of generating an adjusting voltage value of the present invention.

First, the method goes to Step 501, after the monitoring module 20 detects the alternating current signal waveform of the wireless signal, the determining module 30 executes Step 601: rectifying the alternating current signal waveform to a half-wave signal waveform.

The half-wave rectifier module 31 of the determining module 30 is used for receiving the alternating current signal waveform and rectifying it to a half-wave signal waveform.

Then the method goes to Step 602: filtering the half-wave signal waveform to a monitoring voltage value.

The filter module 32 filters the half-wave signal waveform processed by the half-wave rectifier module 31, and outputs a filter signal waveform of single voltage; the voltage is the monitoring voltage value.

Then the method goes to Step 603: obtaining a standard voltage value according to a setting power of the wireless signal.

After the filter module 32 processes the obtaining monitoring voltage value, the output power comparator module 331 knows the setting power of the wireless signal from the wireless signal processing module 3, and uses a list of queries to check the corresponding standard voltage value of the setting power.

Then the method goes to Step 604: comparing if the monitoring voltage value and the standard voltage value are different.

The voltage comparator module 33 compares if the monitoring voltage value obtained from the processing of the filter module 32 and the standard voltage value obtained from the output power comparator module 331 are the same, such that the type of the alternating current signal waveform can be determined to be a constant amplitude W1 (as shown in FIG. 3A) or a non-constant amplitude W2 (as shown in FIG. 3B).

When the monitoring voltage value obtained from the processing of the filter module 32 and the standard voltage value are the same, it represents that the resonance point coordinate of the antenna module 2 is not shifted (as shown in FIG. 1A), and also represents that the type of the current alternating current signal waveform is a constant amplitude W1. At this moment, the method goes to Step 503, the direct current voltage regulator module 34 outputs the regular voltage value to the capacitance adjusting unit 40 to keep the capacitance value of the capacitance adjusting unit 40.

When the monitoring voltage value obtained from the processing of the filter module 32 and the standard voltage value are different, it represents that the resonance point coordinate of the antenna module 2 is shifted (as shown in FIG. 1B), and also represents that the type of the current alternating current signal waveform is a non-constant amplitude W2. At this moment, the method goes to Step 504, the direct current voltage regulator module 34 generates the adjusting voltage value according to the difference between the monitoring voltage value and the standard voltage value, and delivers it to the capacitance adjusting unit 40. Finally, after the direct current voltage regulator module 34 outputs the adjusting voltage value, the method returns to Step 505 to change the capacitance value of the capacitance adjusting unit 40.

A protection module 50 can be further electrically connected to the connecting of the determining module 30 and the antenna module 2, for preventing the direct current voltage regulator module 34 and the adjusting voltage value outputted by the direct current voltage regulator module 34 to be interfered by the wireless signal radiated from the antenna module 2.

It is to be understood that, the step sequence of the antenna performance adjusting method of the present invention is not limited to the abovementioned description; if the object of the present invention is achieved, the step sequence can be changed arbitrarily.

By the abovementioned adjustment module 10 and the antenna performance adjusting method, the performance of the antenna module 2 can be monitored at any time. If there is a human body or a metal object closed to the antenna module 2, or there is other reason causing the resonance point coordinate of the antenna module 2 to be shifted, such that the delivering becomes poor, the abovementioned adjustment module 10 and the antenna performance adjusting method can automatically adjust the antenna module 2 at any time.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. An adjustment module for adjusting an antenna module, the antenna module is located in an electronic device for radiating a wireless signal, the adjustment module comprising:

a monitoring module electrically connected to the antenna module for detecting an alternating current signal waveform when the antenna module radiates the wireless signal;

a determining module electrically connected to the monitoring module for receiving the alternating current signal waveform, and generating an adjusting voltage value when the alternating current signal waveform is a non-constant amplitude, wherein the determining module further generates a regular voltage value when the alternating current signal waveform is a constant amplitude, for keeping the capacitance value of the capacitance adjusting unit; and a capacitance adjusting unit electrically connected to the determining module and the antenna module for changing a capacitance value according to the adjusting voltage value to adjust a resonance point coordinate of the antenna module.

2. The adjustment module as claimed in claim 1, wherein the determining module comprises:

a half-wave rectifier module electrically connected to the monitoring module, for rectifying the alternating current signal waveform to a half-wave signal waveform;

a filter module electrically connected to the half-wave rectifier module for filtering the half-wave signal waveform to a monitoring voltage value;

an output power comparator module for obtaining a standard voltage value according to a setting power of the wireless signal;

a voltage comparator module electrically connected to the filter module and the output power comparator module, for comparing the monitoring voltage value and the standard voltage value; and a direct current voltage regulator module electrically connected to the voltage comparator module and the capacitance adjusting unit; when the monitoring voltage value is different from the standard voltage value, the direct current voltage regulator module outputs the adjusting voltage value to the capacitance adjusting unit.

3. The adjustment module as claimed in claim 2, further comprising a protection module electrically connected to the direct current voltage regulator module and the antenna module, for preventing the adjusting voltage value to be interfered by the wireless signal.

4. The adjustment module as claimed in claim 3, wherein the protection module comprises an inductance element and a capacitance element.

5. The adjustment module as claimed in claim 1, wherein the determining module is a digital signal processor.

6. The adjustment module as claimed in claim 1, wherein the monitoring module is a coupler electrically connected to the antenna module, for receiving the alternating current signal waveform.

7. An electronic device with the adjustment module comprising:
an antenna module for radiating a wireless signal;
a wireless signal processing module electrically connected to the antenna module, for setting a setting power of the wireless signal; and
the adjustment module for adjusting the antenna module, the adjustment module comprising:
a monitoring module electrically connected to the antenna module, for detecting an alternating current signal waveform when the antenna module radiates the wireless signal;
a determining module electrically connected to the monitoring module for receiving the alternating current signal waveform, and generating an adjusting voltage value when the alternating current signal waveform is a non-constant amplitude, wherein the determining module further generates a regular voltage value when the alternating current signal waveform is a constant amplitude, for keeping the capacitance value of the capacitance adjusting unit; and
a capacitance adjusting unit electrically connected to the determining module and the antenna module, for changing a capacitance value according to the adjusting voltage value to adjust a resonance point coordinate of the antenna module.

8. The electronic device with the adjustment module as claimed in claim 7, wherein the determining module comprises:
a half-wave rectifier module electrically connected to the monitoring module, for rectifying the alternating current signal waveform to a half-wave signal waveform
a filter module electrically connected to the half-wave rectifier module for filtering the half-wave signal waveform to a monitoring voltage value;
an output power comparator module electrically connected to the wireless signal processing module for obtaining a standard voltage value according to the setting power of the wireless signal;
a voltage comparator module electrically connected to the filter module and the output power comparator module, for comparing the monitoring voltage value and the standard voltage value; and
a direct current voltage regulator module electrically connected to the voltage comparator module and the capacitance adjusting unit; when the monitoring voltage value and the standard voltage value are different, the direct current voltage regulator module outputs the adjusting voltage value to the capacitance adjusting unit.

9. The electronic device with the adjustment module as claimed in claim 8, further comprising a protection module electrically connected to the direct current voltage regulator module and the antenna module, for preventing the adjusting voltage value to be interfered by the wireless signal.

10. The electronic device with the adjustment module as claimed in claim 9, wherein the protection module comprises an inductance element and a capacitance element.

11. The electronic device with the adjustment module as claimed in claim 7, wherein the determining module is a digital signal processor.

12. The electronic device with the adjustment module as claimed in claim 7, wherein the monitoring module is a coupler electrically connected to the antenna module, for receiving the alternating current signal waveform.

13. An antenna performance adjusting method, applied to an adjustment module of an electronic device for adjusting an antenna module, the method comprising the steps of:
detecting an alternating current signal waveform when the antenna module radiates a wireless signal;
determining if the alternating current signal waveform is a constant amplitude;
generating an adjusting voltage value when the alternating current signal waveform is a non-constant amplitude;
generating a regular voltage value to keep the capacitance value of the capacitance adjusting unit when the alternating current signal waveform is the constant amplitude; and
changing a capacitance value of a capacitance adjusting unit according to the adjusting voltage value, for adjusting a resonance point coordinate of the antenna module.

14. The antenna performance adjusting method as claimed in claim 13, wherein the step of determining if the alternating current signal waveform is the constant amplitude further comprises:
rectifying the alternating current signal waveform to a half-wave signal waveform;
filtering the half-wave signal waveform to a monitoring voltage value;
obtaining a standard voltage value according to a setting power of the wireless signal;
comparing if the monitoring voltage value and the standard voltage value are different; and
determining if the alternating current signal waveform is the non-constant amplitude and outputting the adjusting voltage value when the monitoring voltage value and the standard voltage value are different.

* * * * *